US009838833B2

United States Patent
Terashita

(10) Patent No.: US 9,838,833 B2
(45) Date of Patent: Dec. 5, 2017

(54) COMMUNICATION APPARATUS

(71) Applicant: Brother Kogyo Kabushiki Kaisha, Nagoya-shi, Aichi-ken (JP)

(72) Inventor: Kunihito Terashita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/279,643

(22) Filed: Sep. 29, 2016

(65) Prior Publication Data

US 2017/0094451 A1    Mar. 30, 2017

(30) Foreign Application Priority Data

Sep. 29, 2015  (JP) ................................. 2015-192152

(51) Int. Cl.
| | |
|---|---|
| *H04W 4/00* | (2009.01) |
| *H04W 84/12* | (2009.01) |
| *H04W 84/22* | (2009.01) |
| *H04W 4/06* | (2009.01) |
| H04W 88/02 | (2009.01) |

(52) U.S. Cl.
CPC ............. *H04W 4/008* (2013.01); *H04W 4/06* (2013.01); *H04W 84/12* (2013.01); *H04W 88/02* (2013.01)

(58) Field of Classification Search
CPC ......... H04W 4/00; H04W 4/06; H04W 4/008; H04W 84/00; H04W 84/12; H04W 84/22
See application file for complete search history.

(56) References Cited

U.S. PATENT DOCUMENTS

| | | | |
|---|---|---|---|
| 7,359,339 B2 | 4/2008 | Benson et al. | |
| 8,457,085 B2 | 6/2013 | Izaki | |
| 9,117,164 B2* | 8/2015 | Park | H04W 4/008 |
| 9,612,777 B2* | 4/2017 | Kim | G06F 3/1204 |
| 2005/0135236 A1 | 6/2005 | Benson et al. | |

(Continued)

FOREIGN PATENT DOCUMENTS

| | | |
|---|---|---|
| JP | 2005-184844 A | 7/2005 |
| JP | 2009-044701 A | 2/2009 |
| JP | 2013-115687 A | 6/2013 |

OTHER PUBLICATIONS

Jun. 30, 2016—Co-pending U.S. Appl. No. 15/198,612.

(Continued)

*Primary Examiner* — Blane Jackson
(74) *Attorney, Agent, or Firm* — Banner & Witcoff, Ltd.

(57) ABSTRACT

A communication apparatus may include: a first wireless interface; a second wireless interface; a processor. The communication apparatus may perform: in a case where a first communication link via the second wireless interface is established with a first external apparatus while the communication apparatus operates as a first parent station of a first wireless network, operating as a second parent station of a second wireless network different from the first wireless network, each of the first wireless network and the second wireless network being for performing a wireless communication via the first wireless interface; and after the communication apparatus has started an operation as the second parent station, establishing a wireless connection via the first wireless interface with the first external apparatus so as to cause the first external apparatus to participate as a child station in the second wireless network.

15 Claims, 9 Drawing Sheets

(56) References Cited

U.S. PATENT DOCUMENTS

| | | |
|---|---|---|
| 2009/0046686 A1 | 2/2009 | Izaki |
| 2013/0137414 A1 | 5/2013 | Matsuda |
| 2013/0260683 A1 | 10/2013 | Suzuki et al. |
| 2014/0004793 A1* | 1/2014 | Bandyopadhyay ... H04W 4/008 |
| | | 455/41.1 |

OTHER PUBLICATIONS

Wi-Fi Alliance Technical Committee P2P Task Group, "Wi-Fi Peer-to-Peer (P2P) Technical Specification", Version 1.1, pp. 1-159, 2010.

* cited by examiner

FIG. 2 (First and Second Embodiment)

(First Embodiment)
(Case A1)

(Second Embodiment)

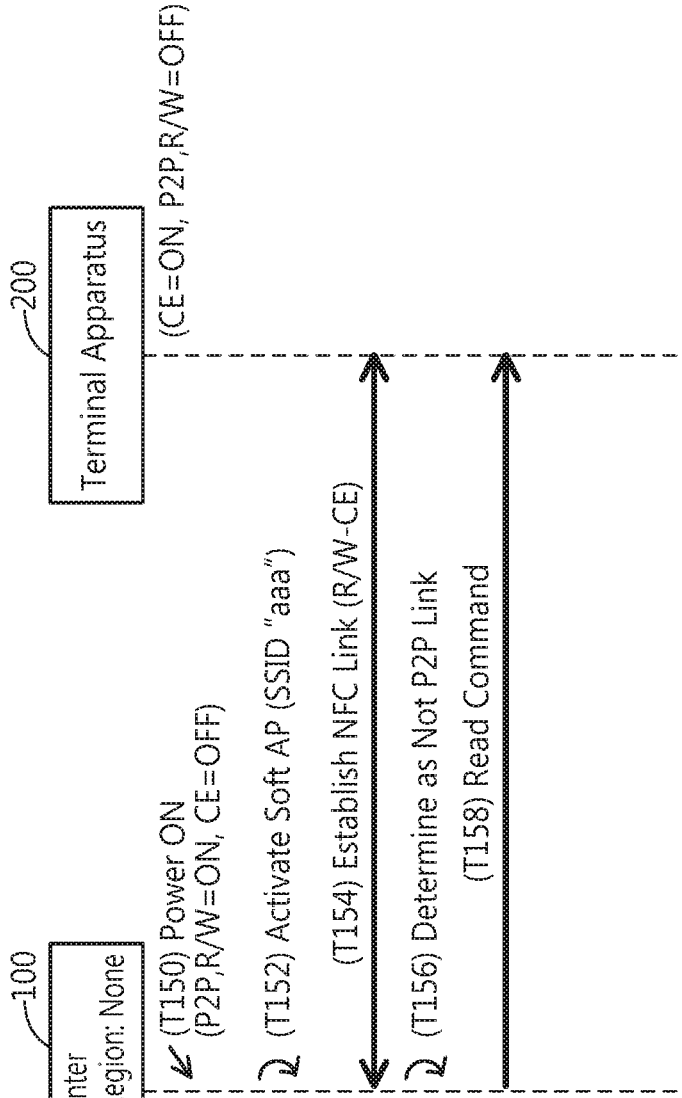

COMMUNICATION APPARATUS

CROSS-REFERENCE TO RELATED APPLICATIONS

This application claims priority to Japanese Patent Application No. 2015-192152, filed on Sep. 29, 2015, the contents of which are hereby incorporated by reference into the present application.

TECHNICAL FIELD

The present teachings disclose a communication apparatus capable of operating as a parent station of a wireless network to cause an external apparatus to participate as a child station in the wireless network.

DESCRIPTION OF RELATED ART

Various techniques to be used by a communication apparatus in order to form a wireless network are known. For example, a communication apparatus supporting a so-called Soft AP function is capable of activating a Soft AP and operating as a parent station of a wireless network. In addition, a communication apparatus supporting the WFD (abbreviation of Wi-Fi Direct (registered trademark)) scheme formulated by the Wi-Fi Alliance is capable of making a transition to a G/O (abbreviation of Group Owner) state in accordance with the WFD scheme to operate as a parent station of a wireless network. While operating as a parent station of a wireless network, a communication apparatus can establish a wireless connection with another apparatus and cause the other apparatus to participate as a child station in the wireless network.

SUMMARY

For example, a situation is conceivable where a communication apparatus operates as a parent station of a wireless network for a given purpose. In this case, for example, when another apparatus participates in the wireless network as a child station in order to realize a purpose that differs from the given purpose, there is a risk that the communication apparatus may not be able to appropriately realize the different purpose. The present teachings provide a communication apparatus capable of appropriately realizing a purpose desired by another apparatus.

A communication apparatus disclosed herein may comprise: a first wireless interface; a second wireless interface different from the first wireless interface; a processor; and a memory storing computer-readable instructions therein, the computer-readable instructions, when executed by the processor, causing the communication apparatus to perform: in a case where a first communication link via the second wireless interface is established with a first external apparatus while the communication apparatus operates as a first parent station of a first wireless network, operating as a second parent station of a second wireless network different from the first wireless network, each of the first wireless network and the second wireless network being for performing a wireless communication via the first wireless interface; and after the communication apparatus has started an operation as the second parent station, establishing a wireless connection via the first wireless interface with the first external apparatus so as to cause the first external apparatus to participate as a child station in the second wireless network.

A control method for realizing the communication apparatus described above, computer-readable instructions for realizing the communication apparatus described above, and a computer-readable recording medium that stores the computer-readable instructions are also novel and useful.

BRIEF DESCRIPTION OF DRAWINGS

FIG. 9 shows a sequence diagram of a case B2 where a printer performs a Read process.

EMBODIMENTS

Figure 1:
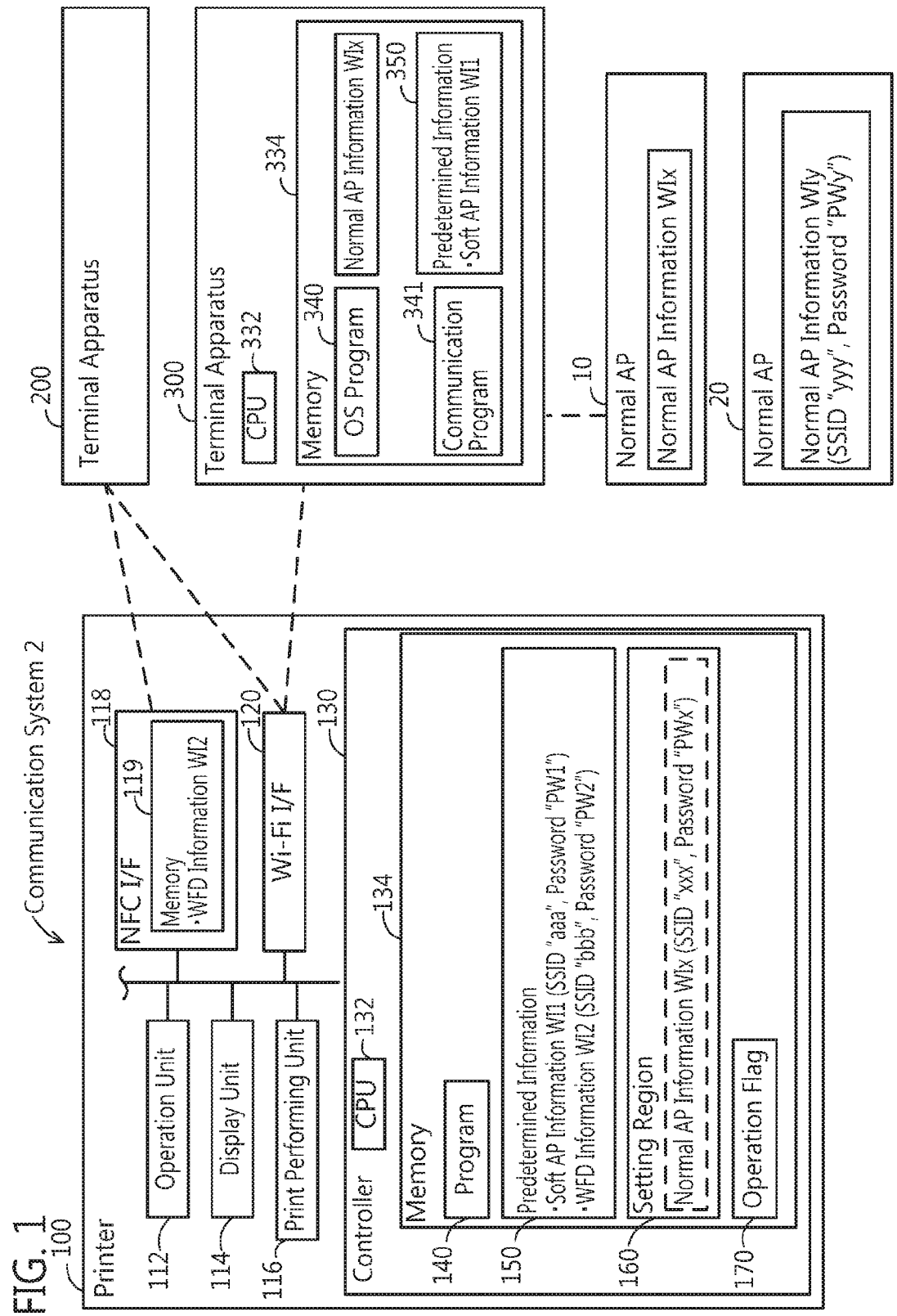
FIG. 1 shows a configuration of a communication system.

First Embodiment (Configuration of Communication System 2: FIG. 1)

As shown in FIG. 1, a communication system 2 includes a printer 100 and terminal apparatuses 200 and 300. The printer 100 and the terminal apparatuses 200 and 300 are capable of establishing a wireless connection with normal access points 10 and 20. Hereinafter, a normal access point will be referred to as a "normal AP (abbreviation of access point)".

(Configuration of Printer 100)

The printer 100 includes an operation unit 112, a display unit 114, a print performing unit 116, an NFC (abbreviation of Near Field Communication) interface 118, a Wi-Fi interface 120, and a controller 130. Hereinafter, an interface will be described as an "I/F". The operation unit 112 includes a plurality of keys and accepts an operation of a user. The display unit 114 is a display for displaying various kinds of information and also functions as a so-called touch panel. In other words, the display unit 114 also functions as an operating unit. Hereinafter, wherever an operating unit of the printer 100 is described, the reference numerals 112 and 114 will be omitted and a simple description of "operating unit" will be used. The print performing unit 116 includes a printing mechanism adopting an inkjet scheme, a laser scheme, or the like.

The NFC I/F 118 is an I/F for performing wireless communication in accordance with the NFC scheme. The NFC scheme is, for example, a wireless communication scheme based on an international standard such as ISO/IEC 21481 or ISO/IEC 18092. The NFC I/F 118 includes a memory 119. The memory 119 stores WFD information WI2 (to be described later) to be sent to the outside. The WFD information WI2 is stored in the memory 119 when power of the printer 100 is turned ON. Specifically, when the power of the printer 100 is turned ON, a CPU 132 provides the WFD information WI2 to the NFC I/F 118 and causes the WFD information WI2 to be stored in the memory 119. The NFC I/F 118 is an NFC forum device and is capable of selectively operating in any of a P2P (abbreviation of Peer to Peer) mode, an R/W (abbreviation of Reader/Writer) mode, and a CE (abbreviation of Card Emulation) mode.

The Wi-Fi I/F 120 is an I/F for performing wireless communication in accordance with the Wi-Fi scheme. The Wi-Fi scheme is a wireless communication scheme which conforms to a standard formulated by the Wi-Fi Alliance and which is based on, for example, the IEEE (abbreviation of The Institute of Electrical and Electronics Engineers, Inc.) 802.11 standard or to equivalent standards thereof (for example, 802.11a, 802.11b, 802.11g, and 802.11n). In particular, the Wi-Fi I/F 120 supports a Soft AP (abbreviation of Software Access Point) function. Furthermore, the Wi-Fi I/F 120 supports the WFD scheme. Details of the WFD scheme are described in "Wi-Fi Peer-to-Peer (P2P) Technical Specification Version 1.1" created by the Wi-Fi Alliance. Details of the WFD scheme are also disclosed in US Patent Application Publication No. 2013/0260683, the contents of which are hereby incorporated by reference into the present disclosure.

The Wi-Fi I/F 120 is incapable of performing wireless communication in accordance with the Soft AP function and wireless communication in accordance with the WFD scheme at the same time. In other words, for example, the printer 100 cannot further operate as a G/O of the WFD scheme during operating as a Soft AP and, similarly, cannot further operate as a Soft AP during operating as a GI/O. However, in a modification, the Wi-Fi I/F 120 may be capable of performing wireless communication in accordance with the Soft AP function and wireless communication in accordance with the WFD scheme at the same time.

Differences between the NFC I/F 118 and the Wi-Fi I/F 120 will now be described. A communication speed of wireless communication via the Wi-Fi I/F 120 (for example, a maximum communication speed of 11 to 600 Mbps) is higher than a communication speed of wireless communication via the NFC I/F 118 (for example, a maximum communication speed of 100 to 424 Kbps). In addition, a frequency of a carrier wave in wireless communication via the Wi-Fi I/F 120 (for example, in 2.4 GHz band or 5.0 GHz band) differs from a frequency of a carrier wave in wireless communication via the NFC I/F 118 (for example, in 13.56 MHz band). Furthermore, a maximum distance over which wireless communication via the Wi-Fi I/F 120 can be performed (for example, a maximum distance of approximately 100 m) is greater than a maximum distance over which wireless communication via the NFC I/F 118 can be performed (for example, a maximum distance of approximately 10 cm).

The controller 130 includes a CPU 132 and a memory 134. The memory 134 is constituted by a ROM, a RAM, or the like and stores, in advance, a program 140 and predetermined information 150 prior to shipment of the printer 100. The CPU 132 executes various processes in accordance with the program 140. The predetermined information 150 is information to be referred to by the CPU 132 in the course of executing the program 140 and includes Soft AP information WI1 and WFD information WI2.

The Soft AP information WI1 is information used in a wireless network (hereinafter, referred to as a "Soft APNW") that is formed when the printer 100 operates as a Soft AP. The printer 100 operating as a Soft AP can establish a Soft AP connection with a terminal apparatus (for example, 300) by using the Soft AP information WI1 and cause the terminal apparatus to participate as a child station in the Soft APNW. The Soft AP information WI1 includes an SSID (abbreviation of Service Set Identifier) "aaa" and a password "PW1". The SSID is an identifier for identifying a wireless network. The password is information used for authentication and encryption by a wireless network. While the Soft AP information WI1 is stored in advance in the memory 134 prior to the shipment of the printer 100 in the present embodiment, in a modification, the Soft AP information WI1 may be installed to the memory 134 from, for example, a server an the Internet after the shipment of the printer 100.

The WFD information WI2 is information used in a wireless network (hereinafter, referred to as a "WFDNW") that is formed by the printer 100 operating as a G/O (abbreviation of Group Owner) of the WFD scheme. The printer 100 operating as a G/O can establish a WFD connection with a terminal apparatus (for example, 200) by using the WFD information WI2 and cause the terminal apparatus to participate as a child station in the WFDNW. The WFD information WI2 includes an SSID "bbb" and a password "PW2". The SSID "bbb" and the password "PW2" respectively differ from the SSID "aaa" and the password "PW1" included in the Soft AP information WI1. While the WFD information WI2 is stored in advance in the memory 134 prior to the shipment of the printer 100 in the present embodiment, in a modification, the WFD information WI2 may be generated by the CPU 132 and stored in the memory 134 at a predetermined timing such as when the power of the printer 100 is turned ON.

The Soft APNW and the WFDNW are used to realize purposes that differ from each other. The Soft APNW is used to realize a purpose that normal AP information is received from a terminal apparatus (for example, 300) and stored in a setting region 160. On the other hand, the WFDNW is used to realize a purpose that a print performing request is received from a terminal apparatus (for example, 200) and printing is performed.

The memory 134 further includes the setting region 160. Normal AP information (for example, WIx) may be stored in the setting region 160. Normal AP information is information used in a wireless network (hereinafter, referred to as a "normal APNW") that is formed by a normal AP (for example, 10). The printer 100 can establish a normal AP connection with a normal AP by using normal AP information and participate in the normal APNW as a child station.

The memory 134 further stores an operation flag 170. The operation flag 170 is set to either a value of "OFF" signifying that a setup start operation has not been performed or a value of "ON" signifying that a setup start operation has been performed.

(Configuration of Terminal Apparatus 200)

The terminal apparatus 200 is a portable apparatus such as a tablet PC, a smart phone, or the like. The terminal apparatus 200 includes an NFC I/F and a Wi-Fi I/F (both not shown). The Wi-Fi I/F of the terminal apparatus 200 may or may not support the WFD scheme.

(Configuration of Terminal Apparatus 300)

The terminal apparatus 300 may be a stationary apparatus such as a desktop PC or a portable apparatus such as a laptop PC, a tablet PC, a smart phone, or the like. The terminal apparatus 300 includes a Wi-Fi I/F (not shown). The Wi-Fi I/F of the terminal apparatus 300 may or may not support the WFD scheme. In addition, the terminal apparatus 300 may or may not comprise an NFC I/F.

The terminal apparatus 300 further comprises a CPU 332 and a memory 334. The CPU 332 executes various processes in accordance with an OS (abbreviation of Operating System) program 340 stored in the memory 334. The terminal apparatus 300 has established a normal AP connection with the normal AP 10 and is participating as a child station in a normal APNW formed by the normal AP 10. The memory 334 stores normal AP information WIx for establishing the normal AP connection.

The memory 334 further stores a communication program 341 and predetermined information 350. The respective pieces of data 341 and 350 are installed to the terminal apparatus 300 from an Internet server (not shown) provided by a vendor of the printer 100. In a modification, respective pieces of data 341 and the like may be installed to the terminal apparatus 300 from a medium shipped together with the printer 100.

The communication program 341 is a program for sending the normal AP information WIx of the normal AP 10 to the printer 100. The predetermined information 350 is information to be referred to by the CPU 332 in the course of executing the communication program 341 and includes the Soft AP information WI1.

(Configuration of Normal APs 10 and 20)

Each of the normal APs 10 and 20 is a known AP referred to as a wireless AP, a wireless LAN router, and the like. The normal AP 10 stores normal AP information WIx to be used in a normal APNW formed by the normal AP 10. The normal AP information WIx includes an SSID "xxx" and a password "PWx". The normal AP 20 stores normal AP information WIy to be used in a normal APNW formed by the normal AP 20. The normal AP information WIy includes an SSID "yyy" and a password "PWy".

The normal AP 10 establishes a normal AP connection with the terminal apparatus 300 in accordance with, for example, a so-called automatic wireless setting such as a WPS (Wi-Fi Protected Setup) or a manual wireless setting. As a result, the normal AP information WIx of the normal AP 10 is stored in the memory 334 of the terminal apparatus 300.

Figure 2:
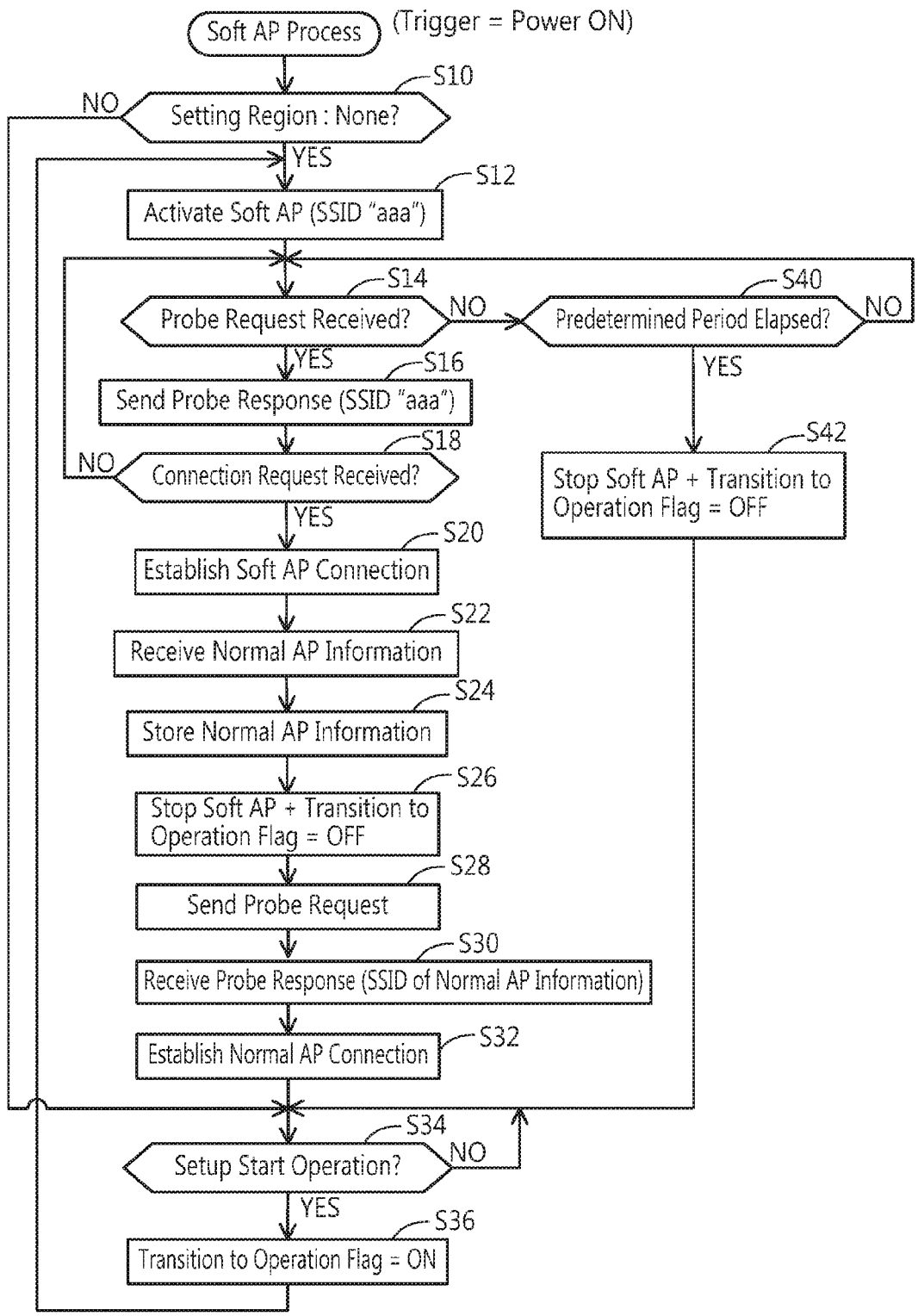
FIG. 2 shows a flowchart of a Soft AP process of a printer.

(Soft AP Process of Printer 100: FIG. 2)

Next, contents of the Soft AP process executed by the CPU 132 will be described with reference to FIG. 2. The process shown in FIG. 2 is started every time power of the printer 100 is turned ON. At a start of the process shown in FIG. 2, the operation flag 170 is set to OFF.

In S10, the CPU 132 determines whether or not normal AP information is stored in the setting region 160. When normal AP information is not stored in the setting region 160, the CPU 132 determines YES in S10 and proceeds to S12. On the other hand, when normal AP information (for example, WIx) is stored in the setting region 160, the CPU 132 determines NO in S10, skips S12 to S32, and proceeds to S34.

In S12, the CPU 132 activates a Soft AP. Accordingly, the printer 100 forms a Soft APNW by using the Soft AP information WI1 and starts operation as a parent station (in other words, a Soft AP) of the Soft APNW. In this manner, in the present embodiment, the printer 100 starts operating as a Soft AP when power is turned ON. Therefore, by performing an operation for turning the power ON, a user can cause the printer 100 to operate as a Soft AP. Convenience of the user is improved as compared to a configuration which requires a separate operation for activating a Soft AP to be performed after performing an operation for turning the power ON.

Next, the CPU 132 starts monitoring of S14 and S40. In S14, the CPU 132 monitors receiving of a probe request from a terminal apparatus. A probe request is a signal for searching for an apparatus that is a connection object. When the CPU 132 receives a probe request from a terminal apparatus via the Wi-Fi I/F 120, the CPU 132 determines YES in S14 and proceeds to S16. Hereinafter, the terminal apparatus that is a sending source of the probe request in S14 will be referred to as a "specific apparatus".

In S16, the CPU 132 sends a probe response that is a response signal to the probe request to the specific apparatus via the Wi-Fi I/F 120. The response includes the SSID "aaa" in the Soft AP information WI1.

In S18, the CPU 132 determines whether or not a connection request is to be received from the specific apparatus via the Wi-Fi I/F 120. A connection request is a signal for requesting that a Soft AP connection be established and, specifically, refers to a probe request including the SSID "aaa". When the specific apparatus receives the probe response of S16 from the printer 100, the specific apparatus determines whether or not the specific apparatus stores an SSID identical to the SSID "aaa" in the response. The specific apparatus sends a connection request to the printer 100 in a case where the SSID identical to the SSID "aaa" is stored. On the contrary, the specific apparatus does not send the connection request to the printer 100 in a case where the SSID identical to the SSID "aaa" is not stored. When the CPU 132 receives a connection request from the specific apparatus, the CPU 132 determines YES in S18 and proceeds to S20. On the other hand, when a predetermined period of time lapses after the sending of the response in S16 without receiving a connection request from the specific apparatus, the CPU 132 determines NO in S18 and returns to the monitoring of S14 and S40.

In addition, in S40, the CPU 132 monitors a lapse of a predetermined period of time from the activation of the Soft AP in S12. When the predetermined period of time lapses without receiving the probe request and the connection request (NO in S14, NO in S18), the CPU 132 determines YES in S40 and proceeds to S42. In S42, the CPU 132 stops the Soft AP and causes the Soft APNW to disappear. In addition, when the operation flag 170 is set to ON (refer to S36 to be described later), the CPU 132 causes the operation flag 170 to transfer to OFF, and when the operation flag 170 is set to OFF, the CPU 132 causes the operation flag 170 to maintain the OFF setting. When S42 ends, the process proceeds to S34.

In S20, the CPU 132 establishes a Soft AP connection with the specific apparatus via the Wi-Fi I/F 120 by using the Soft AP information WI1. Specifically, the CPU 132 performs communication of various signals (for example, an Authentication signal, an Association signal, and a 4-way handshake) with the specific apparatus via the Wi-Fi I/F 120. During the communication of the various signals, the CPU 132 receives an SSID and a password from the specific apparatus and determines whether or not the SSID and the password are identical to the SSID "aaa" and the password "PW1" in the Soft AP information WI1. When the CPU 132 determines that the received SSID and password are identical to the Soft AP information WI1 or, in other words, when authentication of the specific apparatus is successful, the CPU 132 establishes a Soft AP connection with the specific apparatus and causes the specific apparatus to participate as a child station in a Soft APNW.

In S22, the CPU 132 receives, by using the uses Soft APNW, normal AP information stored in the specific apparatus from the specific apparatus. For example, when the specific apparatus is the terminal apparatus 300 (refer to FIG. 1), the CPU 132 receives the normal AP information WIx from the terminal apparatus 300.

In S24, the CPU 132 causes the normal AP information received in S22 to be stored in the setting region 160 in the memory 134. When normal AP information has already been stored in the setting region 160 at the point of S24, the CPU 132 causes the normal AP information received in S22 to be stored in the setting region 160 so as to replace the existing AP information (in other words, the normal AP information is updated).

In S26, the CPU 132 stops the Soft AP and causes the Soft APNW to disappear. As a result, the Soft AP connection between the printer 100 and the specific apparatus is disconnected. In addition, when the operation flag 170 is set to ON (refer to S36 to be described later), the CPU 132 causes the operation flag 170 to transfer to OFF, and when the operation flag 170 is set to OFF, the CPU 132 causes the operation flag 170 to be maintained to the OFF setting.

In S28, the CPU 132 sends a probe request by broadcast via the Wi-Fi I/F 120. When the respective normal APs 10 and 20 receive the request of S28, the normal APs 10 and 20 send a probe response including an SSID (for example, "xxx") used in a normal APNW to the printer 100.

In S30, the CPU 132 receives a probe response from the respective normal APs 10 and 20 via the Wi-Fi I/F 120. The CPU 132 specifies a probe response including the SSID in the normal AP information stored in S24 among the one or more probe responses and determines that a normal AP connection with a normal AP that is a sending source of the probe response (hereinafter, referred to as a "specific normal AP") should be established.

In S32, the CPU 132 establishes the normal AP connection with the specific normal AP via the Wi-Fi I/F 120 by using the Soft AP information WI1. Specifically, the CPU 132 performs communication of various signals (for example, an Authentication signal, an Association signal, and a 4-way handshake) with the specific normal AP via the Wi-Fi I/F 120. During the communication of the various signals, the CPU 132 sends the normal AP information stored in S24 to the specific normal AP and causes the specific normal AP to perform authentication of the normal AP information or, in other words, authentication of the printer 100. Accordingly, the CPU 132 establishes a normal AP connection with the specific normal AP and causes the printer 100 to participate as a child station in a normal APNW. When S32 ends, the process proceeds to S34. Moreover, the process proceeds to S34 even when the CPU 132 fails to establish a normal AP connection with the specific normal AP in S32.

In S34, the CPU 132 monitors that the operating unit accepts a setup start operation. When the operating unit accepts a setup start operation, the CPU 132 determines of YES in S34 and, in S36, causes the operation flag 170 to transfer to ON. When S36 ends, in S12, the CPU 132 activates the Soft AP and performs the monitoring processes of S14 and S40. Subsequent processes are similar to those described above.

Figure 3:
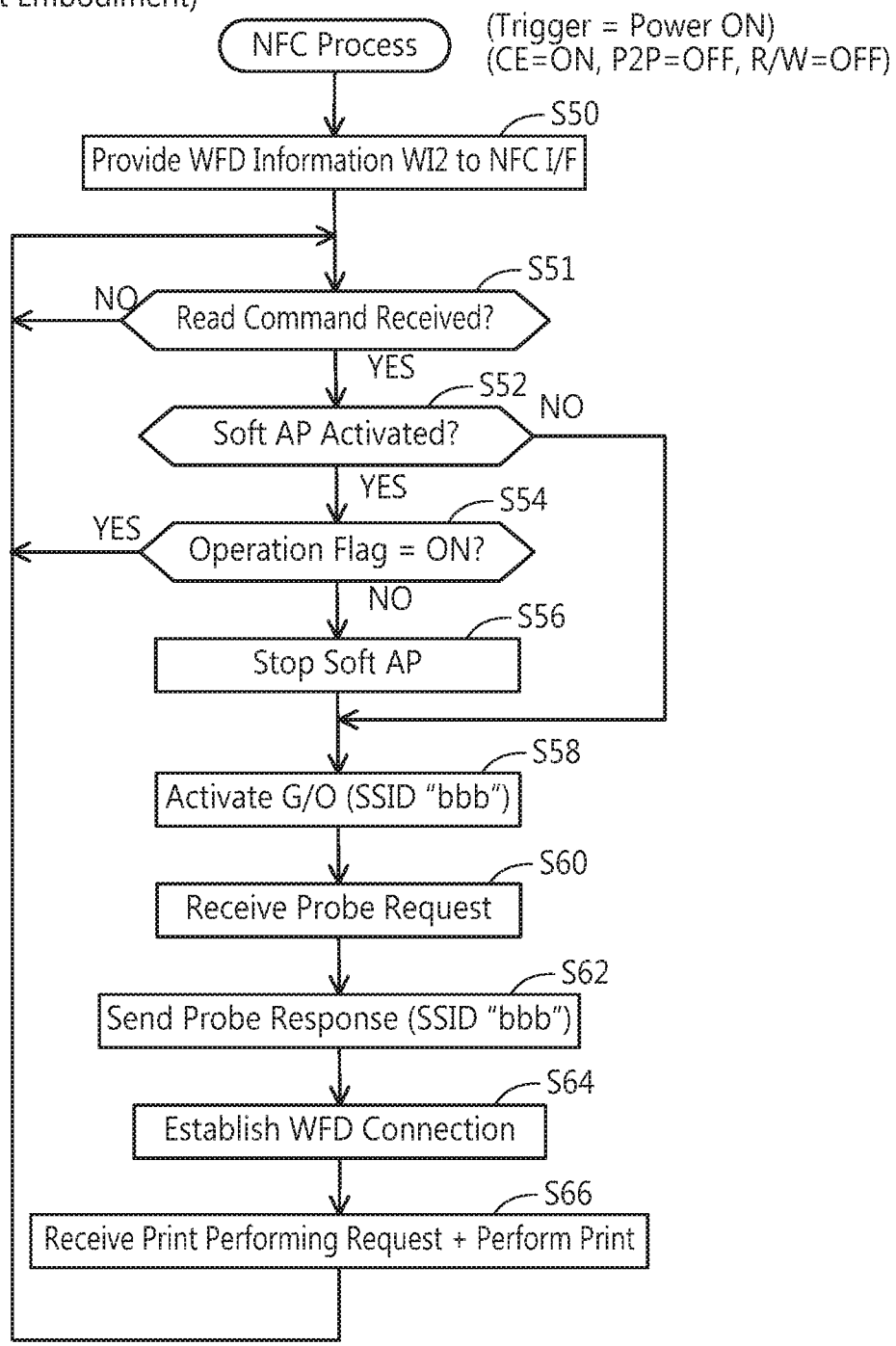
FIG. 3 shows a flowchart of an NFC process of a printer.

(NFC Process: FIG. 3)

Next, contents of the NFC process executed by the CPU 132 will be described with reference to FIG. 3. The process shown in FIG. 3 is started when power of the printer 100 is turned ON. At a point when the process shown in FIG. 3 is started, at the NFC I/F 118, the CE mode is switched ON (in other words, enabled) and the R/W mode and the P2P mode are switched OFF (in other words, disabled).

In S50, the CPU 132 provides WFD information WI2 in the predetermined information 150 to the NFC I/F 118 and causes the WFD information WI2 to be stored in the memory 119.

In S51, the CPU 132 monitors receiving of a Read command from a terminal apparatus (for example, 200) via the NFC I/F 118. When a terminal apparatus at which the R/W mode is switched ON is brought close to the NFC I/F 118, the NFC I/F 118 establishes an NFC link with the terminal apparatus. In the NFC link, the NFC I/F 118 operates in the CE mode and the terminal apparatus operates in the R/W mode. The terminal apparatus uses the NFC link to send a Read command to the printer 100. The Read command refers to a command for requesting sending of information stored in the memory 119 of the NFC I/F 118. Hereinafter, the terminal apparatus that is a sending source of the Read command will be referred to as an "object apparatus". When the NFC I/F 118 receives the Read command from the object apparatus, the NFC I/F 118 sends the WFD information WI2 in the memory 119 to the object apparatus by using the NFC link. The NFC I/F 118 further provides event information indicating that the Read command has been received to the CPU 132. When the CPU 132 receives the event information from the NFC I/F 118, the CPU 132 determines YES in S51 and proceeds to S52.

In S52, the CPU 132 determines whether or not a Soft AP has been activated. When the CPU 132 determines that a Soft AP has been activated (refer to S12 in FIG. 2), the CPU 132 determines YES in S52 and proceeds to S54. When the CPU 132 determines that a Soft AP has not activated, the CPU 132 determines NO in S52, skips S54 and 56, and proceeds to S58.

In S54, the CPU 132 determines whether or not the operation flag 170 is set to ON. When the CPU 132 determines that the operation flag 170 is set to ON (refer to S36 in FIG. 2), the CPU 132 determines YES in S54 and returns to the monitoring process of S51 without executing the processes of S56 and thereafter. When the CPU 132 determines that the operation flag 170 is set to OFF, the CPU 132 determines NO in S54 and, in s56, stops the Soft AP and causes the Soft APNW to disappear.

In S58, the CPU 132 causes an operating state of the printer 100 to transfer from a device state to a G/O state of the WFD scheme. Accordingly, the printer 100 starts operation as a G/O and forms a WFDNW in which the WFD information WI2 in the predetermined information 150 is used.

In S60, the CPU 132 receives a probe request from an object apparatus via the Wi-Fi I/F 120. In S62, the CPU 132 sends a probe response including the SSID "bbb" in the WFD information WI2 to the object apparatus via the Wi-Fi I/F 120. In other words, the CPU 132 sends a probe response including the SSID used in the WFDNW formed in S58 to the object apparatus.

In S64, the CPU 132 establishes a WFD connection with the object apparatus via the Wi-Fi I/F 120 by using the WFD information WI2. Specifically, the CPU 132 performs communication of various signals (for example, an Authentication signal, an Association signal, and a 4-way handshake) with the object apparatus via the Wi-Fi I/F 120. During the communication of the various signals, the CPU 132 receives the WFD information WI2 sent by the NFC I/F 118 from the object apparatus and determines that authentication of the object apparatus has been successful. Accordingly, the CPU 132 establishes a WFD connection with the object apparatus and causes the object apparatus to participate as a child station in a WFDNW In S66, the CPU 132 receives a print performing request from the object apparatus by using the WFDNW. The print performing request includes a command for causing the printer 100 to perform printing and print data representing an image that is a print object. When the CPU 132 receives a print performing request, the CPU 132 provides print data to the print performing unit 116 and causes the print performing unit 116 to perform printing of an image represented by the print data. When S66 ends, the process returns to the monitoring process of S51.

(Specific Cases)

Figure 5:
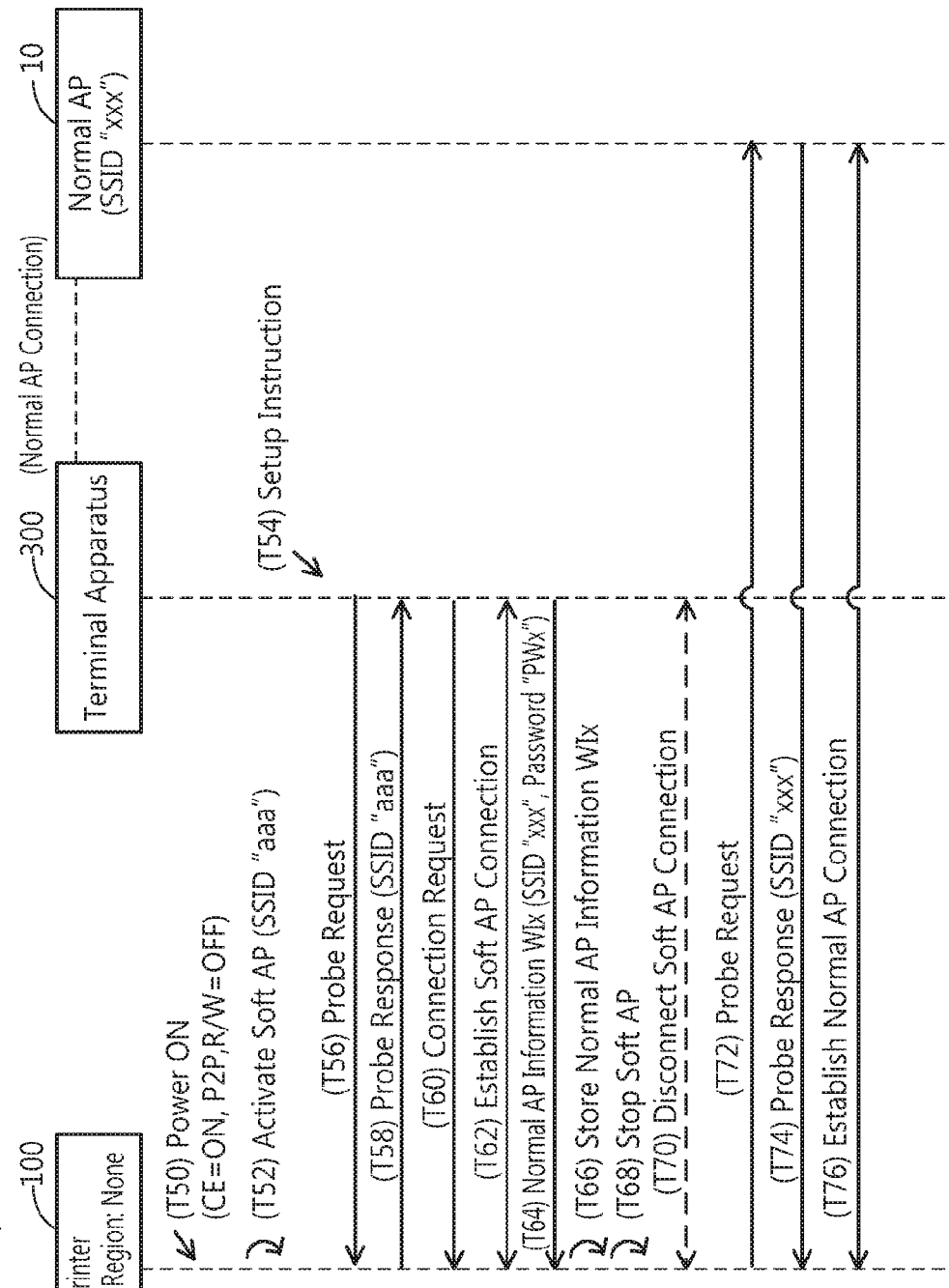
FIG. 5 shows a sequence diagram of a case A2 where a printer establishes a normal AP connection with a normal AP.
Figure 6:
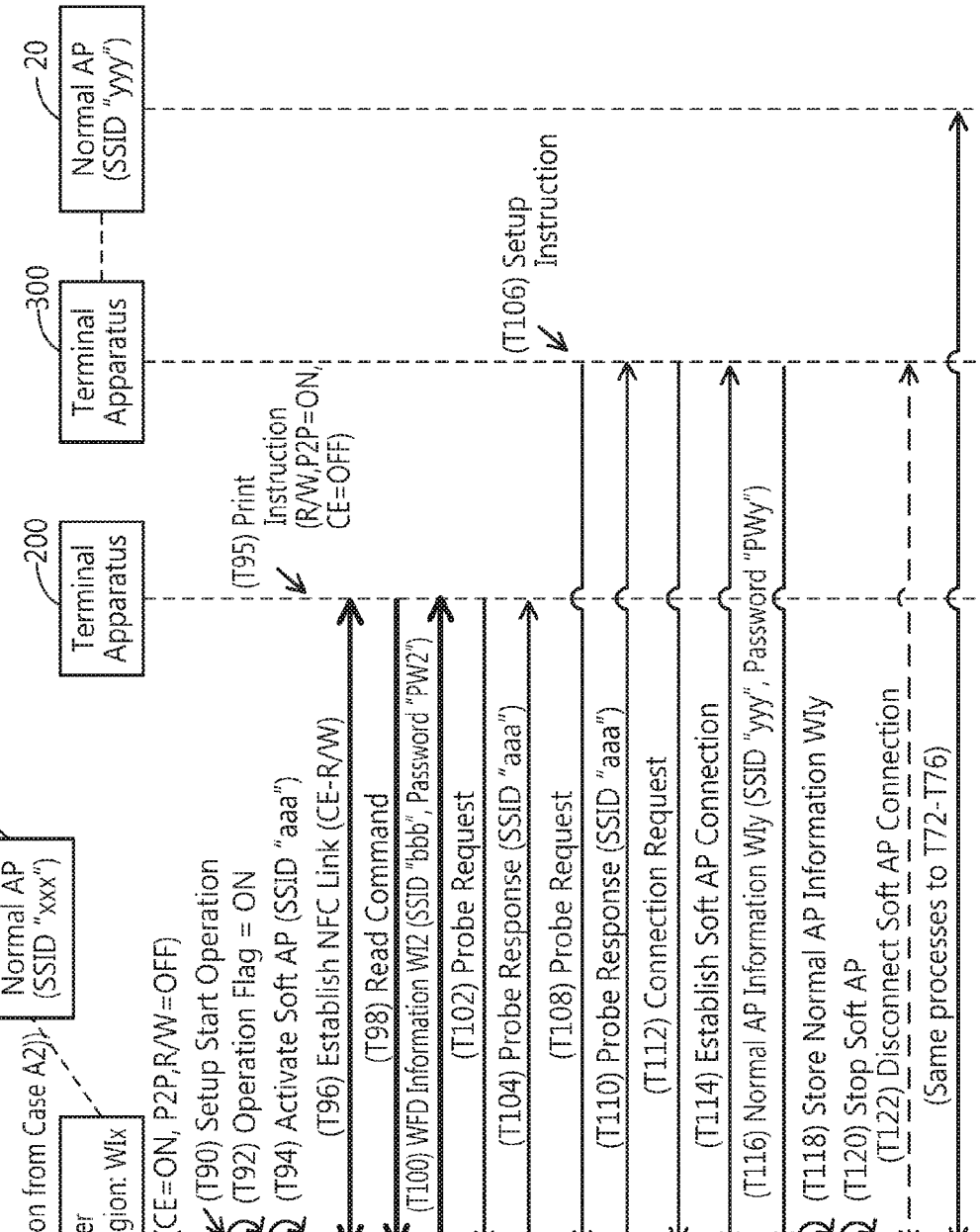
FIG. 6 shows a sequence diagram of a case A3 where a printer establishes the normal AP connection with a normal AP which differs from the normal AP shown in FIG. 5.

Next, specific cases A1 to A3 which are realized according to the flowcharts shown in FIGS. 2 and 3 will be described with reference to FIGS. 4 to 6. Bold arrows and fine arrows in FIGS. 4 to 6 respectively depict communication via the NFC I/F 118 and communication via the Wi-Fi I/F 120. This convention also applies to FIGS. 8 and 9 (in other words, a second embodiment) to be described later.

(Case A1: FIG. 4)

Case A1 is a case where the printer 100 receives a print performing request from the terminal apparatus 200 and performs printing before establishing a normal AP connection with a normal AP (for example, 10). At a point of start of the case A1, normal AP information is not stored in the setting region 160 (refer to FIG. 1).

In T10, the power of the printer 100 is turned ON. Accordingly, at the NFC I/F 118, the CE mode is switched ON and the P2P mode and the R/W mode are switched OFF. In the present embodiment, the NFC I/F 118 is maintained in this state while power of the printer 100 is turned ON. In addition, in T10, the printer 100 causes the memory 119 of the NFC I/F 118 to store the WFD information WI2 (S50 in FIG. 3). In T12, the printer 100 activates a Soft AP and forms a Soft APNW that is identified by the SSID "aaa" (in FIG. 2, YES in S10, S12).

In T14, a print instruction is input to the terminal apparatus 200. Accordingly, at the NFC I/F of the terminal apparatus 200, the R/W mode and the P2P mode are switched ON and the CE mode is switched OFF.

In T16, as the terminal apparatus 200 is brought close to the printer 100, an NFC link is established in which the printer 100 operates in the CE mode and the terminal apparatus 200 operates in the R/W mode. In T18, the printer 100 receives a Read command from the terminal apparatus 200 by using the NFC link (YES in S51 in FIG. 3). Next, in T20, the printer 100 sends the WFD information WI2 to the terminal apparatus 200 by using the NFC link.

In T22, the printer 100 stops the Soft AP and causes the Soft APNW to disappear (in FIG. 3, YES in S52, NO in S54, S56). In T24, the printer 100 causes the operating state of the printer 100 to transfer from a device state to a G/O state of the WFD scheme (S58). Accordingly, the printer 100 starts operation as a G/O of a WFDNW and forms a WFDNW that is identified by the SSID "bbb".

In T26, the printer 100 receives a probe request from the terminal apparatus 200 (S60) and, in T28, the printer 100 sends a probe response to the terminal apparatus 200 (S62). The probe response includes the SSID "bbb" for identifying the WFDNW formed in T24. In T30, the printer 100 establishes a WFD connection with the terminal apparatus 200 by using the WFD information WI2 and causes the terminal apparatus 200 to participate as a child station in the WFDNW (864).

In T32, the printer 100 receives a print performing request including print data from the terminal apparatus 200 by using the WFDNW (S66) and, in T134, performs printing of an image represented by the print data (S66).

As described above, in the case where the NFC link with the terminal apparatus 200 is established, the printer 100 sends the WFD information WI2 to the terminal apparatus 200 by using the NFC link (T20). As a result, the printer 100 can appropriately establish a WFD connection with the terminal apparatus 200 by using the WFD information WI2 (T30). Therefore, the printer 100 can receive a print performing request from the terminal apparatus 200 and appropriately perform printing. In addition, while the printer 100 causes the WFD information WI2 to be stored in the memory 119 of the NFC I/F 118 when power of the printer 100 is turned ON (refer to S50 in FIG. 3), the printer 100 does not cause the Soft AP information WI1 to be stored in the memory 119. Therefore, even in the case where the NFC link with the terminal apparatus 200 is established, the printer 100 does not send the Soft AP information WI1 to the terminal apparatus 200. In other words, the printer 100 does not send the Soft AP information WI1 which should be used to realize a first purpose (in other words, receiving of normal AP information) to the terminal apparatus 200 which desires a second purpose (in other words, performing a print function) to be realized Therefore, the Soft AP information WI1 can be prevented from being used in order to realize the first purpose by the terminal apparatus 200 which desires a second purpose to be realized, and the terminal apparatus 200 can be prevented from participating in a Soft APNW for realizing the first purpose.

In addition, in the case where the NFC link with the terminal apparatus 200 is established (T16), the printer 100 stops the Soft AP (122) and, subsequently, starts operation as a G/O (T24). As described above, the Wi-Fi I/F 120 is configured so as to be incapable of performing wireless communication in accordance with the Soft AP function and wireless communication in accordance with the WFD scheme at the same time. Although the printer 100 comprises the Wi-Fi I/F 120 configured in this manner, the printer 100 can appropriately realize the second purpose that is desired by the terminal apparatus 200.

(Case A2: FIG. 5)

Case A2 is a case where the printer 100 establishes a normal AP connection with the normal AP 10. At a point of start of the case A2, normal AP information has not been stored in the setting region 160 and the terminal apparatus 300 has established a normal AP connection with the normal AP 10.

Figure 4:
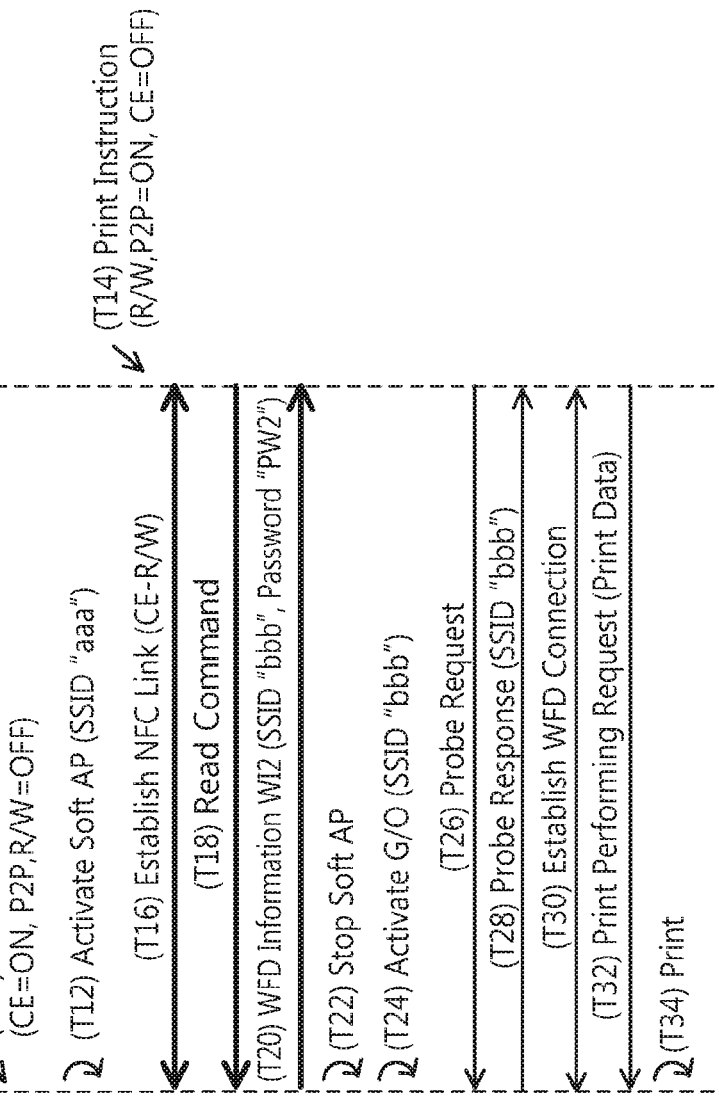
FIG. 4 shows a sequence diagram of a case A1 where a printer performs printing.

T50 and T52 are similar to T10 and T12 shown in FIG. 4. In T54, a setup instruction for activating the communication program 341 is input to the terminal apparatus 300. Accordingly, the terminal apparatus 300 sends a probe request by broadcast.

In T56, the printer 100 receives a probe request from the terminal apparatus 300 (YES in S14 in FIG. 2) and sends a probe response including the SSID "aaa" for identifying the Soft APNW formed in T52 to the terminal apparatus 300 (S16).

When the terminal apparatus 300 receives the response of T58, the terminal apparatus 300 determines that the SSID "aaa" included in the response is identical to the SSID included in the Soft AP information WI1 in the predetermined information 350. In this case, the terminal apparatus 300 sends a connection request to the printer 100.

In T60, the printer 100 receives the connection request from the terminal apparatus 300 (YES in S18). In this case, in T62, the printer 100 establishes a Soft AP connection with the terminal apparatus 300 by using the Soft AP information WI1 and causes the terminal apparatus 300 to participate as a child station in the Soft AP (S20).

In T64, the printer 100 receives normal AP information WIx from the terminal apparatus 300 by using the Soft APNW (S22) and, in T66, causes the normal AP information WIx to be stored in the setting region 160 (S24). In T68, the printer 100 stops the Soft AP and causes the Soft APNW to disappear (S26). As a result, in T70, the Soft AP connection between the printer 100 and the terminal apparatus 300 is disconnected.

Next, in T72, the printer 100 sends a probe request by broadcast (S28) and, in T74, the printer 100 receives a probe response including the SSID "xxx" from the normal AP 10 (S30). In addition, in T76, the printer 100 establishes a normal AP connection with the normal AP 10 by using the normal AP information WIx (S32).

As described above, when the printer 100 receives a connection request from the terminal apparatus 300 while operating as a Soft AP, the printer 100 establishes a Soft AP connection with the terminal apparatus 300 (T62). In addition, the printer 100 receives normal AP information WIx from the terminal apparatus 300 by using a Soft APNW (T64) and establishes a normal AP connection with the normal AP 10 by using the normal AP information WIx (T76). In other words, the printer 100 can appropriately realize the first purpose of receiving the normal AP information WIx from the terminal apparatus 300 by using the Soft APNW. Furthermore, although not shown, the printer 100 can perform, by using a normal APNW, communication with various apparatuses (for example, the terminal apparatus 200) participating in the normal APNW. Moreover, by inputting a setup instruction for activating the communication program 341 to the terminal apparatus 300, the user need no longer perform another operation for causing the printer 100 to participate in a normal APNW (for example, an operation of directly inputting the normal AP information WIx to the printer 100). As a result, convenience of the user can be improved.

(Case A3 (Continuation of Case A2): FIG. 6)

Case A3 is a case where, after the printer 100 establishes a normal AP connection with the normal AP 10 (refer to case A2 in FIG. 5), the printer 100 newly establishes a normal AP connection with the normal AP 20 instead of the normal AP 10. At a point of start of the case A3, normal AP information WIx has been stored in the setting region 160. The operation flag 170 is set to OFF. In addition, after the processes shown in FIG. 5, the terminal apparatus 300 has disconnected the normal AP connection with the normal AP 10 and has established a normal AP connection with the normal AP 20.

In T90, the operating unit of the printer 100 accepts a setup start operation (YES in S34 in FIG. 2). In this case, in T92, the printer 100 causes the operation flag 170 to transfer to ON (S36). T94 to T100 are similar to T12 to T20 shown in FIG. 4.

In the present case, since the operation flag 170 is set to ON, the printer 100 does not stop the Soft AP (YES in S54 in FIG. 3). Therefore, in T102, when the printer 100 receives a probe request from the terminal apparatus 200 (YES in S14 in FIG. 2), in T104, the printer 100 sends a probe response including the SSID "aaa" for identifying the Soft APNW formed in T94 to the terminal apparatus 200 (S16).

When the terminal apparatus 200 receives the response of T104, the terminal apparatus 200 determines that the SSID "aaa" included in the response is not identical to the SSID "bbb" received in T100. In this case, even when the terminal apparatus 200 receives the response of T104, the terminal apparatus 200 does not send a connection request to the printer 100.

On the other hand, in T106, a setup instruction is input to the terminal apparatus 300. Accordingly, the terminal apparatus 300 sends a probe request by broadcast. T108 to T114 are similar to T56 to T62 shown in FIG. 5.

In T116, the printer 100 receives normal AP information WIy from the terminal apparatus 300 by using the Soft APNW (S22 in FIG. 2) and, in T118, the printer 100 causes the normal AP information WIy to be stored in the setting region 160 so as to replace the normal AP information WIx stored in the setting region 160 (S24). Accordingly, the normal AP connection between the printer 100 and the normal AP 10 is disconnected. Next, in T120, the printer 100 stops the Soft AP and causes the Soft APNW to disappear (S26). As a result, in T122, the Soft AP connection between the printer 100 and the terminal apparatus 300 is disconnected. Subsequently, in a similar manner to T72 to T76 in FIG. 5, the printer 100 establishes a normal AP connection with the normal AP 20 by using the normal AP information WIy (S30, S32).

As described above, while the printer 100 is operating as a Soft AP in a state where the operation flag 170 is set to ON, the printer 100 does not stop the Soft AP and does not operate as a G/O even in the case where the NFC link with the terminal apparatus 200 is established (YES in S54 in FIG. 3). In a situation where the operation flag 170 is switched ON (in other words, a situation where a setup start operation has been input), it is highly likely that the user desires the first purpose of having the printer 100 receive normal AP information to be realized. Therefore, by not stopping its operation as a Soft AP, the printer 100 can appropriately realize the first purpose.

Advantage of Present Embodiment

A configuration of a comparative embodiment will be described before describing an advantage of the present embodiment. When an NFC link with a terminal apparatus is established while a Soft AP is being activated in order to realize the first purpose of receiving normal AP information, a printer according to the comparative embodiment sends Soft AP information to the terminal apparatus by using the NFC link. In addition, the printer establishes a Soft AP connection with the terminal apparatus and causes the terminal apparatus to participate as a child station in a Soft APNW. Subsequently, the printer receives a print performing request from the terminal apparatus by using the Soft APNW. However, in the configuration of the comparative embodiment, since the printer monitors the receiving of normal AP information by using the Soft APNW in order to realize the first purpose, even in a case where the printer receives a print performing request by using the Soft APNW, the printer does not perform a print function in accordance with the request. In other words, the printer cannot appropriately realize the second purpose.

On the contrary, in the present embodiment, as shown in FIG. 4, in a case where the NFC link with the terminal apparatus 200 is established (T16) while the printer 100 is operating as a parent station of a Soft APNW (in other words, a Soft AP) in order to realize the first purpose, the terminal apparatus 200 is not allowed to participate in the Soft APNW for the first purpose. The printer 100 operates as a G/O (in other words, a parent station) of a WFDNW for the second purpose and causes the terminal apparatus 200 to participate as a child station in the WFDNW (T30). Subsequently, the printer 100 receives a print performing request by using the WFDNW (T32) and performs a print function in accordance with the request (T34). In this manner, the printer 100 can appropriately realize the second purpose.

(Correspondence)

The printer 100 is an example of a "communication apparatus", the terminal apparatus 200 is an example of a "first external apparatus", and the terminal apparatus 300 is an example of a "second external apparatus". In addition, the Wi-Fi I/F 120 is an example of a "first wireless interface" and the NFC I/F 118 is an example of a "second wireless interface". The print performing unit 116 is an example of an "image process performing unit". A Soft APNW is an example of a "first wireless network" and a "third wireless network". A WFDNW is an example of a "second wireless network". A normal APNW is an example of a "specific wireless network". A Soft AP is an example of a "first parent station" and a "third parent station". A G/O is an example of a "second parent station". An NFC link between the printer 100 and the terminal apparatus 200 is an example of a "first communication link". A case of YES in S40 in FIG. 2 and a case where S24 ends are examples of "in a case where a predetermined condition is satisfied". A setup start operation is an example of "an instruction for causing the communication apparatus to operate as a third parent station". Normal AP information WIx is an example of "specific wireless information".

Second Embodiment

In the present embodiment, the NFC I/F 118 does not comprise the memory 119 for storing WFD information WI2. In addition, in the present embodiment, the process shown in FIG. 7 is executed instead of the process shown in FIG. 3.

(NFC Process: FIG. 7)

Figure 7:
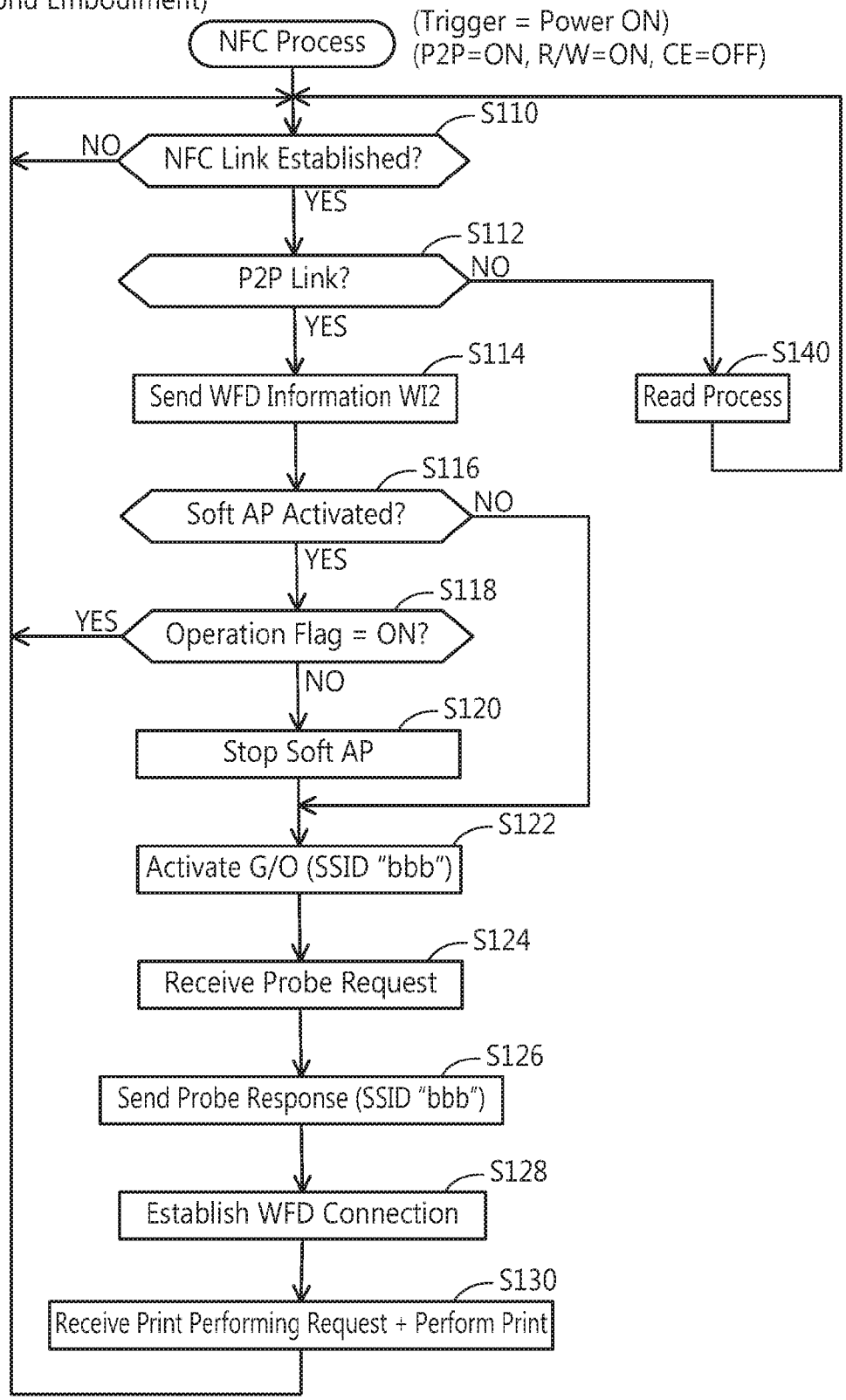
FIG. 7 shows a flowchart of an NFC process according to a second embodiment.

At a point of start of the process shown in FIG. 7, at the NFC I/F 118, the R/W mode and the P2P mode are switched ON and the CE mode is switched OFF.

In S110, the CPU 132 monitors that an NFC link with a terminal apparatus (for example, 200) is established. When any one of a terminal apparatus at which the P2P mode is switched ON and a terminal apparatus at which the CE mode is switched ON is brought close to the NFC I/F 118, the NFC I/F 118 establishes an NFC link with the terminal apparatus. In this case, the NFC I/F 118 provides establishment information indicating that an NFC link has been established to the CPU 132. The establishment information includes either P2P link information indicating that an NFC link in which the printer 100 operates in the P2P mode (in other words, a P2P link) has been established or R/W link information indicating that an NFC link in which the printer 100 operates in the R/W mode (in other words, an R/W link) has been established. When the CPU 132 receives the establishment information from the NFC I/F 118, the CPU 132 determines YES in S110 and proceeds to S112.

In S112, the CPU 132 determines whether or not the NFC link is a P2P link. When the establishment information includes P2P link information, the CPU 132 determines YES in S12 and proceeds to S114. On the other hand, when the establishment information includes R/W link information, the CPU 132 determines NO in S112 and proceeds to S140.

In S114, the CPU 132 provides the WFD information WI2 included in the predetermined information 150 in the memory 134 to the NFC I/F 118. As a result, the NFC I/F 118 sends the WFD information WI2 to a terminal apparatus by using the P2P link. S116 to S130 are similar to S52 to S66 shown in FIG. 3.

On the other hand, in S140, the CPU 132 perform a Read process by using the R/W link. Specifically, the CPU 132 provides a sending instruction of a Read command to the NFC I/F 118. As a result, the NFC I/F 118 sends the Read command to the terminal apparatus by using the R/W link and receives information stored in the terminal apparatus from the terminal apparatus by using the R/W link. For example, when the terminal apparatus stores authentication information of the user and the memory 134 stores a print job associated with the authentication information, in S140, the CPU 132 receives the authentication information from the terminal apparatus by using the R/W link. In this case, the CPU 132 specifies a print job associated with authentication information matching the authentication information received from the terminal apparatus and causes the print performing unit 116 to perform printing in accordance with the specified print job. Once S140 is completed, the CPU 132 returns to the monitoring of S110.

(Specific Cases)

Next, specific cases B1 and B2 which are realized according to the flow charts shown in FIGS. 2 and 7 will be described with reference to FIGS. 8 and 9.

(Case B1: FIG. 8)

Case B1 represents a case where the printer 100 receives a print performing request from the terminal apparatus 200 and performs printing before establishing a normal AP connection with a normal AP (for example, 10).

In T110, the power of the printer 100 is turned ON. Accordingly, at the NFC I/F 118, the P2P mode and the R/W mode are switched ON and the CE mode is switched OFF. T112 and T114 are similar to T12 and T14 shown in FIG. 4.

In T116, a P2P link is established between the printer 100 and the terminal apparatus 200 (YES in S110 in FIG. 7). In T118, the printer 100 determines that the NFC link in T116 is a P2P link (YES in S112). Subsequently, in T120, the printer 100 sends the WFD information WI2 to the object apparatus by using the NFC link (114). T122 to T134 are similar to T22 to T34 shown in FIG. 4.

(Case B2: FIG. 9)

Case B2 represents a case where the printer 100 performs a Read process before establishing a normal AP connection with a normal AP (for example, 10). At a point of start of case B2, at the NFC I/F of the terminal apparatus 200, the CE mode is switched ON and the R/W mode and the P2P mode are switched OFF.

Figure 8:
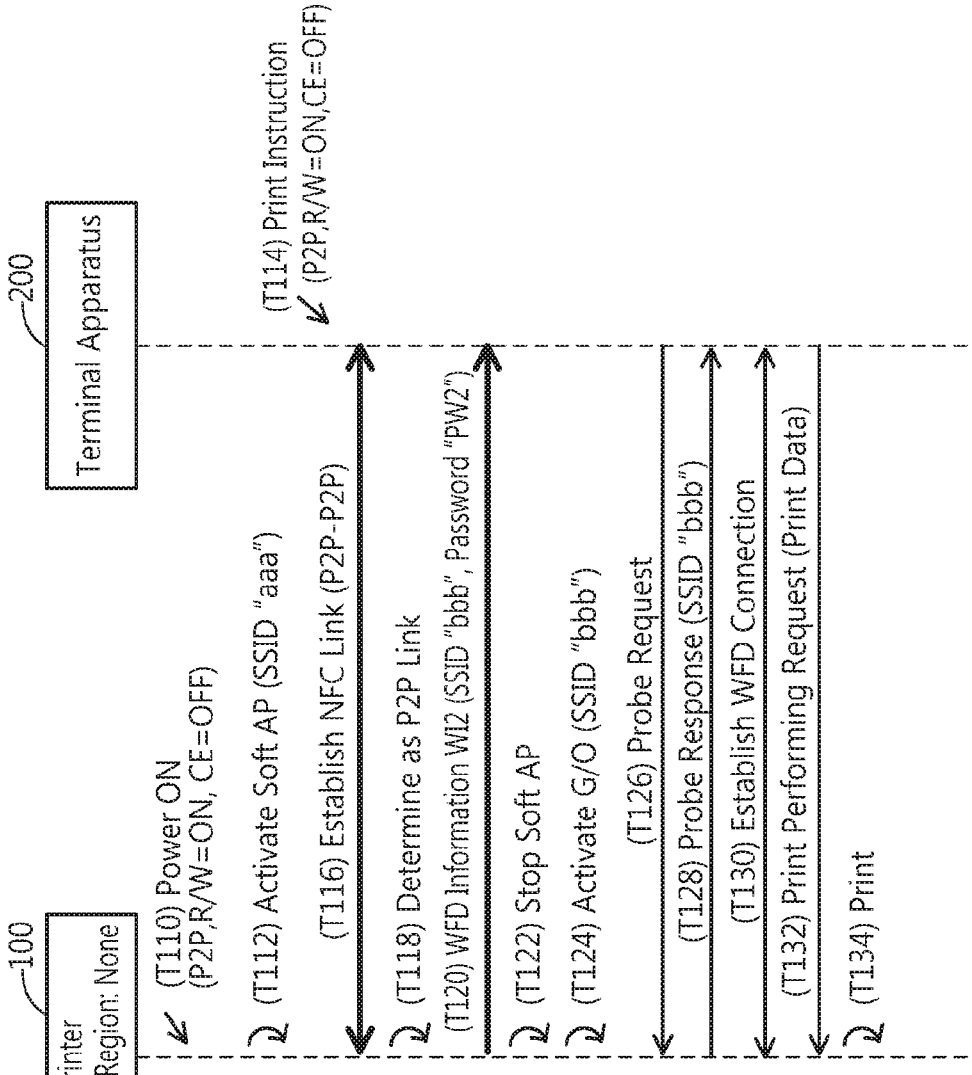
FIG. 8 shows a sequence diagram of a case B1 where a printer performs printing.

T150 and T152 are similar to T110 and 1T112 shown in FIG. 8. In T154, an R/W link is established between the printer 100 and the terminal apparatus 200 (YES in S110 in FIG. 7). In T156, the printer 100 determines that the NFC link in T154 is not a P2P link (NO in S112). Subsequently, in T158, the printer 100 sends a Read command to the terminal apparatus 200 by using the NFC link (S140). Accordingly, the printer 100 can receive information stored in the terminal apparatus 200 from the terminal apparatus 200 by using the NFC link.

Advantage of Present Embodiment

As shown in the examples in FIGS. 8 and 9, in the present embodiment, the printer 100 switches between sending and not sending the WFD information WI2 to the terminal apparatus 200 depending on whether or not an NFC link established with the terminal apparatus 200 is the P2P link. When the NFC link established with the terminal apparatus 200 is the P2P link, the user of the terminal apparatus 200 desires to realize the second purpose of performing the print function. When the terminal apparatus 200 desires to realize the second purpose, the printer 100 according to the present embodiment can appropriately realize the second purpose by using a WFDNW. In the present embodiment, a P2P link is an example of a "first communication link" and an R/W link is an example of a "second communication link".

Third Embodiment

As described earlier, in the first embodiment, as shown in FIG. 4, the NFC I/F 118 of the printer 100 receives a Read command from the terminal apparatus 200 and sends WFD information WI2 to the terminal apparatus 200.

Instead, in the present embodiment, the printer 100 does not store the WFD information WI2 but the terminal apparatus 200 stores the WFD information WI2. In the present embodiment, the NFC I/F 118 of the printer 100 receives WFD information WI2 from the terminal apparatus 200 by receiving a Write command including the WFD information WI2 from the terminal apparatus 200. Even in the present embodiment, the printer 100 is capable of forming a WFDNW in which the WFD information W2 is used.

In addition, as shown in the second embodiment, when a P2P link is established between the printer 100 and the terminal apparatus 200, the printer 100 may receive WFD information WI2 from the terminal apparatus 200 by using the NFC link. Even in the present embodiment, the printer 100 is capable of forming a WFDNW in which the WFD information WI2 is used.

While specific embodiments of the technique disclosed herein have been described above, it is to be understood that the embodiments are merely examples and are not intended to limit the scope of claims of the invention. The techniques described in the claims include various modifications and changes made to the embodiments presented above. Modifications of the embodiments described above will be presented below.

(Modification 1) In the respective embodiments described above, the CPU 132 starts operation as a Soft AP every time power of the printer 100 is turned ON (in FIG. 2, YES in S10, S12). Instead, the CPU 132 may start operation as a Soft AP when power of the printer 100 is initially turned ON after shipment, and when power of the printer 100 is turned ON for second and subsequent times after shipment, the CPU 132 may not start operation as a Soft AP (hereinafter, referred to as a "first configuration"). Alternatively, the CPU 132 may start operation as a Soft AP when power of the printer 100 is initially turned ON after initialization of the printer 100, and when power of the printer 100 is turned ON for second and subsequent times after initialization of the printer 100, the CPU 132 may not start operation as a Soft AP (hereinafter, referred to as a "second configuration"). The CPU 132 may realize both the first configuration and the second configuration or only one of the first configuration and the second configuration.

(Modification 2) The Wi-Fi I/F 120 may be capable of performing wireless communication in accordance with the Soft AP function and wireless communication in accordance with the WFD scheme at the same time. In this case, when an NFC link with a terminal apparatus is established while the printer 100 is operating as a Soft AP (YES in S51 in FIG. 3, YES in S112 in FIG. 7), the CPU 132 may start operation as a G/O of a WFDNW (S58 in FIG. 3, S122 in FIG. 7) without stopping the Soft AP (in other words, without performing S56 in FIG. 3 or S120 in FIG. 7). In other words, the printer 100 may perform operation as a parent station of a Soft APNW (in other words, a Soft AP) and operation as a parent station of a WFDNW (in other words, a G/O) at the same time. In other words, the printer 100 may maintain operation as a Soft AP while power is turned ON. In this case, "stopping the operation as the first parent station", "operating as the third parent station", and "stopping the operation as the first parent station" can be omitted.

(Modification 3) The predetermined information 150 and 350 may further include second Soft AP information which differs from first Soft AP information WI1. The CPU 132 may form a first Soft APNW in which the first Soft AP information WI1 is used in S12 in FIG. 2 when power of the printer 100 is turned ON. In addition, the CPU 132 may form a second Soft APNW in which the second Soft AP information is used in S12 when a setup start operation is input. In the present modification, the first Soft APNW is an example of a "first wireless network" and the second Soft APNW is an example of a "third wireless network".

(Modification 4) In S12 in FIG. 2, instead of causing the printer 100 to operate as a Soft AP, the CPU 132 may cause the printer 100 to operate as a G/O. In the present modification, the G/O is an example of a "first parent station" and a "third parent station". In S58 in FIG. 3 and S122 in FIG. 7, the CPU 132 may cause the printer 100 to operate as a Soft AP instead of causing the printer 100 to operate as a G/O. In the present modification, the Soft AP is an example of a "second parent station".

(Modification 5) A "communication apparatus" is not limited to the printer 100 and may be a scanner capable of performing a scan function. In this case, a scan performing unit is used in place of the print performing unit 116. In addition, in S66 in FIG. 3 and S130 in FIG. 7, a scan performing request is received. Subsequently, scan data is sent to an object terminal by using a WFDNW. In the present modification, the scan performing unit is an example of an "image process performing unit". In another modification, a "communication apparatus" may be an apparatus (for example, a PC, a server, or a portable terminal (a mobile phone, a smart phone, a PDA, or the like)) performing a function (for example, a display function or a computing function) which differs from a print function and a scan function. In this case, an "image process performing unit" and "causing the image process performing unit perform the image process" can be omitted.

(Modification 6) In the first embodiment, when an NFC link is established with a terminal apparatus, the CPU 132 may perform processes of S52 and thereafter in FIG. 3 before a Read command is received from the terminal apparatus. In other words, the process of S51 in FIG. 3 may be omitted. Specifically, the CPU 132 may acquire establishment information indicating that an NFC link has been established from the NFC L/F 118 before acquiring event information indicating that a Read command has been received from the NFC I/F 118. The CPU 132 may perform the processes of S52 and thereafter when acquiring the establishment information. Generally, "operating as a second parent station" may include operating as a second parent station before the Read command is received from a first external apparatus.

(Modification 7) In the first embodiment, the NFC IF 118 may be an NFC tag instead of an NFC forum device according to the NFC standard. In the present modification, the memory 119 may be a volatile memory or a non-volatile memory. In addition, the printer 100 may include a wireless interface for performing wireless communication in accordance with another standard (for example, Bluetooth (registered trademark) or TransferJet (registered trademark)) in place of the NFC I/F 118. In other words, the "second wireless interface" is not limited to the NFC I/F.

(Modification 8) The CPU 132 may activate a Soft AP not at a timing when the power of the printer 100 is turned ON but at another timing (for example, every predetermined period of time, a timing where a predetermined instruction is input, and the like). In this case, "operating as the first parent station" can be omitted.

(Modification 9) The memory 134 may not store the operation flag 170. In this case, when an NFC link with a terminal apparatus is established while a Soft AP is activated as a result of input of a setup start operation (YES in S51 in FIG. 3, YES in S112 in FIG. 7), the CPU 132 may activate a G/O (S58 in FIG. 3, S122 in FIG. 7). In this case, "operating as a third parent station" can be omitted.

(Modification 10) When an NFC link with a terminal apparatus is established (YES in S51 in FIG. 3), the NFC I/F 118 may further send Soft AP information WI1 to the terminal apparatus in addition to the WFD information WI2. In addition, the terminal apparatus may select the WFD information WI2 for the second purpose among the Soft AP information WI1 and the WFD information WI2 and send a connection request including the SSID "bbb" included in the WFD information W72 to the printer 100. In other words, a "second wireless interface" may send wireless information for participating in a first wireless network to a first external apparatus.

(Modification 11) Instead of receiving normal AP information WIx from a terminal apparatus by using a Soft APNW, the CPU 132 may perform communication of other information with the terminal apparatus by using the Soft APNW. The other information may be, for example, information representing a phone book stored in the terminal apparatus or information representing a status of the printer 100 or the terminal apparatus. In the present modification, "receiving" and "establishing a wireless connection with the access point" can be omitted.

(Modification 12) While the respective processes shown in FIGS. 2, 3, and 7 are realized by software (in other words, a program) in the respective embodiments described above, at least one of the processes shown in FIGS. 2, 3, and 7 may be realized by hardware such as a logic circuit.

What is claimed is:

1. A communication apparatus comprising:
a first wireless interface;
a second wireless interface different from the first wireless interface;
a processor; and
a memory storing computer-readable instructions therein, the computer-readable instructions, when executed by the processor, causing the communication apparatus to perform:
in a case where a first communication link via the second wireless interface is established with a first external apparatus while the communication apparatus operates as a first parent station of a first wireless network, operating as a second parent station of a second wireless network different from the first wireless network, each of the first wireless network and the second wireless network being for performing a wireless communication via the first wireless interface; and
after the communication apparatus has started an operation as the second parent station, establishing a wireless connection via the first wireless interface with the first external apparatus so as to cause the first external apparatus to participate as a child station in the second wireless network.

2. The communication apparatus as in claim 1, wherein the computer-readable instructions, when executed by the processor, cause the communication apparatus to further perform:
operating as the first parent station when power of the communication apparatus is turned on.

3. The communication apparatus as in claim 2, wherein the communication apparatus is caused to operate as the first parent station at one of or both of timings when the power of the communication apparatus is firstly turned on after a shipment of the communication apparatus and when the power of the communication apparatus is firstly turned on after an initialization of the communication apparatus, and
the communication apparatus is not caused to operate as the first parent station when the power of the communication apparatus is turned on in a situation other than when the power of the communication apparatus is firstly turned on after the shipment of the communication apparatus or when the power of the communication apparatus is firstly turned on after the initialization of the communication apparatus.

4. The communication apparatus as in claim 2, wherein the computer-readable instructions, when executed by the processor, cause the communication apparatus to further perform:
stopping operation as the first parent station so as to cause the first wireless network to disappear in a case where a predetermined condition is satisfied for stopping operation as the first parent station after the power of the communication apparatus is turned on; and
operating as a third parent station of a third wireless network in a case where an instruction for causing the communication apparatus to operate as the third parent station is provided in a state where the communication apparatus is not operating as the first parent station, the third wireless network being for performing a wireless communication via the first wireless interface,
wherein the communication apparatus is not caused to operate as the second parent station even if the first communication link is established with the first external apparatus while the communication apparatus operates as the third parent station.

5. The communication apparatus as in claim 1, wherein the computer-readable instructions, when executed by the processor, cause the communication apparatus to further perform:
stopping operation as the first parent station so as to cause the first wireless network to disappear, when the communication apparatus is to operate as the second parent station while the communication apparatus operates as the first parent station.

6. The communication apparatus as in claim 1, wherein:
the second wireless interface sends wireless information for participating in the second wireless network to the first external apparatus in a case where the first communication link is established with the first external apparatus, and
the wireless communication with the first external apparatus via the first wireless interface is established by using the wireless information.

7. The communication apparatus as in claim 1, wherein the second wireless interface does not send wireless information for participating in the first wireless network to the first external apparatus in a case where the first communication link is established with the first external apparatus.

8. The communication apparatus as in claim 1, wherein the computer-readable instructions, when executed by the processor, cause the communication apparatus to further perform:
in a case where a connection request is received from a second external apparatus via the first wireless interface while the communication apparatus operates as the first parent station, establishing a wireless connection with the second external apparatus via the first wireless interface so as to cause the second external apparatus to participate as a child station in the first wireless network;

receiving specific wireless information from the second external apparatus by using the first wireless network, the specific wireless information being wireless information to be used in a specific wireless network formed by an access point; and establishing a wireless connection with the access point via the first wireless interface by using the specific wireless information so as to cause the communication apparatus to participate as a child station in the specific wireless network.

9. The communication apparatus as in claim 1, further comprising:

an image process performing unit, wherein the computer-readable instructions, when executed by the processor, cause the communication apparatus to further perform:

causing the image process performing unit to perform an image process in a case where a request to perform the image process is received from the first external apparatus via the first wireless interface by using the second wireless network.

10. The communication apparatus as in claim 1, wherein:

the second wireless interface is for performing a wireless communication in accordance with an NFC (abbreviation of Near Field Communication) standard, and a communication speed of the wireless communication via the second wireless interface is lower than a communication speed of the wireless communication via the first wireless interface.

11. The communication apparatus as in claim 10, wherein the communication apparatus operates in a P2P (abbreviation of Peer to Peer) mode of the NFC standard in the first communication link.

12. The communication apparatus as in claim 11, wherein:

the communication apparatus is not caused to operate as the second parent station in a case where a second communication link via the second wireless interface is established with the first external apparatus while the communication apparatus operates as the first parent station, and, the communication apparatus operates in a Reader/Writer mode of the NFC standard.

13. The communication apparatus as in claim 10, wherein the communication apparatus operates in a CE (abbreviation of Card Emulation) mode of the NFC standard in the first communication link.

14. The communication apparatus as in claim 13, wherein the communication apparatus is caused to operate as the second parent station in a case where a Read command is received from the first external apparatus via the second wireless interface after the first communication link is established while the communication apparatus operates as the first parent station.

15. A non-transitory computer-readable medium storing computer-readable instructions for a communication apparatus, wherein the computer-readable instructions, when executed by a processor of the communication apparatus, causing the communication apparatus to perform:

in a case where a first communication link via a second wireless interface of the communication apparatus is established with a first external apparatus while the communication apparatus operates as a first parent station of a first wireless network, operating as a second parent station of a second wireless network different from the first wireless network, each of the first wireless network and the second wireless network being for performing a wireless communication via a first wireless interface of the communication apparatus, after the communication apparatus has started an operation as the second parent station, establishing a wireless connection via the first wireless interface with the first external apparatus so as to cause the first external apparatus to participate as a child station in the second wireless network.

* * * * *